United States Patent [19]

Cronin

[11] 4,110,809
[45] Aug. 29, 1978

[54] SOLID STATE POWER CONTROLLER WITH LOW LEVEL SIGNAL CONTROL

[75] Inventor: Michael Joseph Cronin, Sherman Oaks, Calif.

[73] Assignee: Lockheed Aircraft Corporation, Burbank, Calif.

[21] Appl. No.: 755,560

[22] Filed: Dec. 30, 1976

[51] Int. Cl.² .............................................. H02H 3/08
[52] U.S. Cl. ....................................... 361/95; 361/100
[58] Field of Search .................................... 361/95–98, 361/100, 101; 307/38, 40, 41

[56] References Cited
U.S. PATENT DOCUMENTS

| | | | |
|---|---|---|---|
| 3,774,076 | 11/1973 | Weinger | 361/100 X |
| 3,842,317 | 10/1974 | Mattes et al. | 361/100 |

Primary Examiner—Harry E. Moose, Jr.
Attorney, Agent, or Firm—Ralph M. Flygare

[57] ABSTRACT

Power controllers comprising solid state elements responsive to control signals of low power from a remote control location selectively close and open relatively high power circuits to load devices, and including logic circuitry for opening selectively closed power circuits upon occurrence of overloads therein. The controllers also act upon their failure to respond to commands to open or close the power circuit by blowing a protective fuse in the former case and signaling in the latter. The controllers may employ power darlington switches for closing and opening the power circuits. All or most of the logic circuitry may function in providing the control and the overload or mode failure response for two or more load devices.

11 Claims, 4 Drawing Figures

SOLID STATE POWER CONTROLLER WITH LOW LEVEL SIGNAL CONTROL

BACKGROUND OF THE INVENTION

In control of the various electrical loads in airplanes, it is necessary to provide for selective energization of a large number of electrical switching devices for controlling the operation or positioning of elements such as the lights, landing gear, flight control surface, actuation, etc. The control station for these loads is usually located in the forward part of the aircraft in the cockpit or flight control station. The load busses are generally located in the wing roots and are thus quite remote from the control station. An extensive system of heavy gauge electrically conductive control wiring connects the control relays in the load circuits to the control station buss. Each of these control wires is normally protected by circuit breakers which are themselves quite heavy.

For control purposes, it is necessary to locate a control switch for each load at the flight station, and a relay or other power switching device at or near the point of power utilization. Local power busses furnish power to these loads and circuit breakers are used to protect the wiring against overloads and other faults such as short circuits in the power wiring. These circuit breakers must be of high current capacity to safely isolate the fault. Since the control wiring is similarly protected with circuit breakers without current limiting, high fault currents could also prevail in the control wiring. Consequently, a heavy gauge wire and insulation system has been required to protect against a fire or smoke hazard. Since the length of the wiring necessary between the control station and the large number of load stations is great, a necessary disadvantage is excessive weight and increased cost in the control wiring system.

It is accordingly an object of the present invention to obviate these disadvantages and to provide a novel method and improved electric power controller employing solid state construction and operable from a miniature gauge wiring system.

It is a further object of the present invention to provide a novel solid state power controller in the form of a solid state relay which incorporates the features of overcurrent (overload) protection, failure-mode detection logic, status monitoring and input control logic.

Still another object of the present invention is to provide a novel control system for airplanes employing such controllers of solid state construction and miniature gauge wiring.

Yet another object of the present invention is to provide a control system employing a novel and improved solid state controller system wherein solid state circuit logic control circuitry is operable to control two or more associated solid state power switching devices, thereby obviating the necessity for duplication of the expensive logic circuitry for each individual load.

Yet still another object of the present invention is to provide a novel method and system for providing current limiting in the source of the control power, i.e. the control circuit, for the switching of remote loads in the power circuit.

These and other objects and advantages will be apparent from the claims and from the following detailed description when read in conjunction with the appended drawings.

THE DRAWINGS

DETAILED DESCRIPTION

Figure 1:
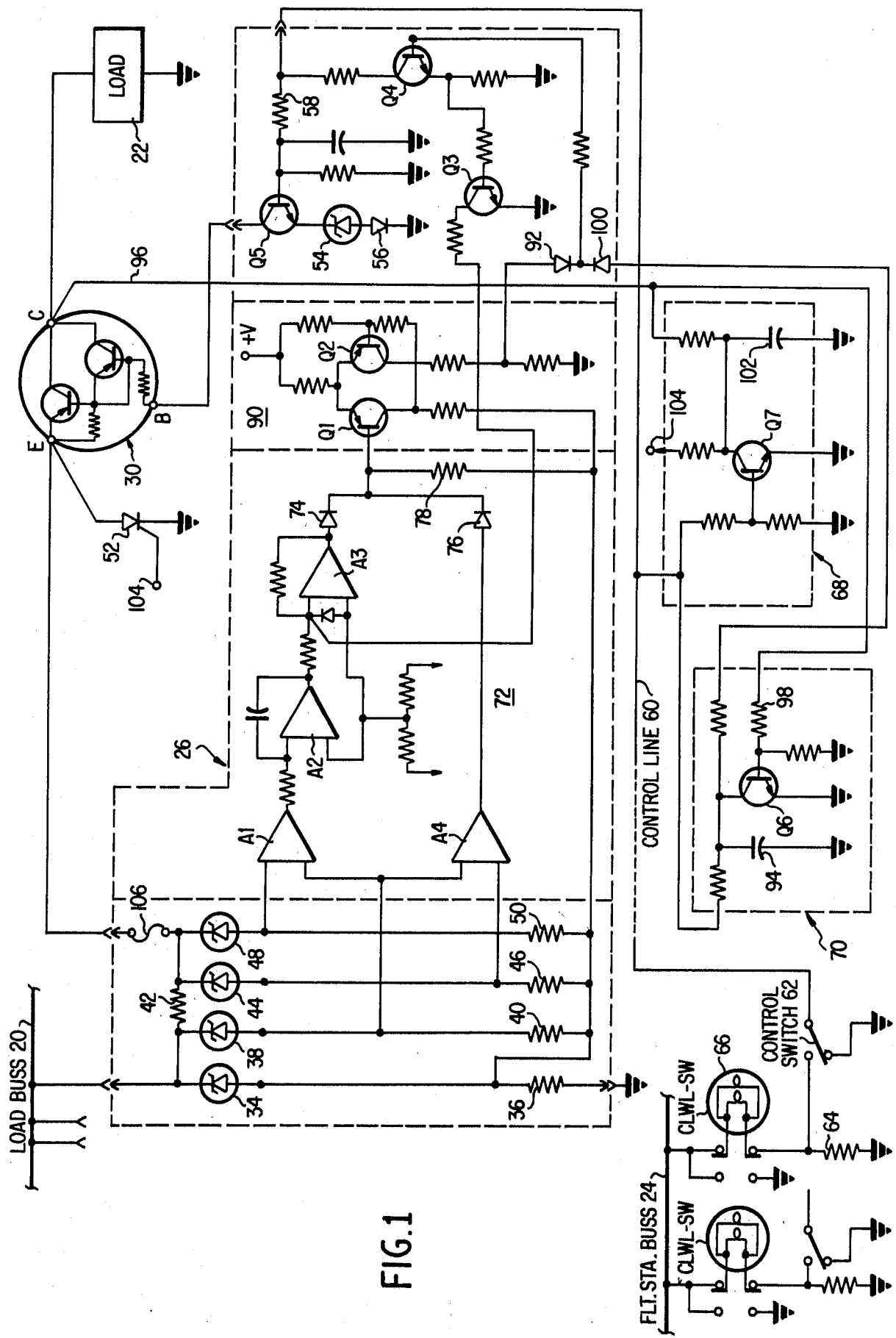
FIG. 1 is a schematic wiring diagram of one embodiment of a control system embodying the solid state power controller of the present invention.

With reference now to FIG. 1, a typical load buss 20 energized from a d.c. source supplies a plurality of loads such as the illustrated load 22 in close proximity thereto. The buss 20 may also supply a flight station or control station buss 24 located in the forward portion of the aircraft. The flight station buss 24 may alternatively be energized from the same or another source of power.

In FIG. 1 the basic solid state controller located between the load buss 20 and the load 22 comprises a controller portion 26 including logic, electronic time delays, protection circuitry and operational amplifiers, and a power switch portion 30 connected thereto by any suitable conventional contact means. The front end of the controller portion 26 includes ground voltage reference circuits connected to the load buss 20 which comprise a Zener diode 34 and a resistor 36. These reference voltage circuits are connected across the Zener diode 34. The first of these comprises a Zener diode 38 and a resistor 40; the second reference voltage circuit comprises a resistor 42, a Zener diode 44 and a resistor 46; and the third reference voltage circuit comprises the resistor 42, a Zener diode 48 and a resistor 50. These voltage reference circuits are used to provide precision analog reference voltages for the overload protection circuits when compared against the Zener diode 38 and resistor 40, which is invariant with power supply changes and with temperature. The resistor 42 provides a voltage analog of load current and affects the voltage seen by the Zener diode 44/resistor 46 and Zener diode 48/resistor 50 networks. This front end circuitry cooperates with the system in providing overload protection in a manner hereinafter more fully described.

The power switch 30 may be PNP power darlington circuit such as Motorola Power Darlington 2N6287, accommodated in a single T03 size can. The power darlington is both inexpensive and readily available and may be easily replaced in the event of its overload, burn out or other failure without changing the more expensive packaged controller 26.

The power switch in the load circuit is shown with its emitter terminal E grounded through the anode-cathode of a silicon controlled rectifier (SCR) 52 for reasons to be hereinafter described.

The electrode base B of the power switch 30 is connected to the collector electrode of an NPN transistor Q5 in the controller 26, the emitter electrode of the transistor Q5 being grounded through a Zener diode 54 and a diode 56. The base electrode of the transistor Q5 is connected through a resistor 58 to a control line 60 which leads to a control switch 62 at the flight station. The ungrounded terminal of the control switch 62 is connected between the bleed resistor 64 on the current limiting warning light switch (CLWL-SW) 66 for the control circuit at the flight station. The CLWL-SW may be of the type disclosed in the copending application, Ser. No. 755,558, entitled "Dual Filament Current Limiting And Status Indicating Circuit" filed on Dec. 30, 1976, concurrently herewith and hereby incorporated herein by reference.

The collector electrode C of the power switch 30 is also connected to two protection circuits 68 and 70 relating respectively to the failure of the power switch 30 to turn off when commanded and the failure of the power switch 30 to turn on when commanded. These two circuits will be described in greater detail. In operation, closure of the control switch 62 operates through the control line 60 of miniature gauge wire to impress a positive potential on the base electrode of the transistor Q5. This renders Q5 conductive and allows base current to flow in the power switch 30, closing that switch and energizing the load 22 therethrough from the power buss 20. In normal operation, the opening of the control switch 62 operates in the reverse manner to remove the forward bias from the transistor Q5 driving it into cutoff and disconnecting the load 22 from the power buss 20 by eliminating the base current of the power switch 30.

With continued reference to FIG. 1, the logic section of the controller portion of the circuit includes a two-section, quad-operational amplifier (LM 324) circuit 72. The first section includes conventional operational amplifiers A1, A2 and A3 arranged to provide a high signal level output signal through a diode 74 upon the existance of an overload condition of a predetermined magnitude for a predetermined time, as indicated by the voltage drop across the sensor resistor 42. The second logic section includes a conventional operational amplifier A4 that reacts to a short circuit current as indicated by a predetermined higher voltage drop across the sensor resistor 42.

Operational amplifiers A1 and A4 both receive the same reference voltage from the resistor 40 and react to the amplitude of the voltage differential from the front end of the system as previously described. This voltage varies with the voltage drop across the sensor resistor 42 in accordance with changes in the load current passing through that resistor and the power switch 30 to the load 22. Referencing the two voltage comparators A4 and the series connected A1–A3 against the common stabilized voltage permits the selection of different trip times by the level settings of the two comparator sections.

The level settings of the two comparator circuits may be only about 200 mv. apart. The inclusion in the operational amplifier A2 in the first section of a feedback capacitor and in the operational amplifier A3 of a feedback resistor provides integration and inversion circuitry in that section to provide a high signal level signal through the diode 74 after a time delay of 0.10 to 0.2 seconds with fault currents up to 300%. The second section may respond to a short circuit condition by providing an effective high signal level signal diode 76 upon the existence of a load current in excess of 5 per unit current for as long as 50 u secs to 100 u secs. The one per unit value used in a practical embodiment may be about 7.5 amps.

The output signals from the two operational amplifier sections through the diodes 74 and 76 act through the voltage drop across a resistor 78 to control a trigger circuit 90 comprising a pair of PNP transistors Q1 and Q2 connected in a Schmitt trigger configuration. The output signal from the trigger circuit 90, when the transistor Q2 saturates in response to an overload condition, is applied through a diode 92 to the base electrode of an NPN transistor Q4 operable, when conducting, to clamp the signal from the control line 60 to ground potential thereby disabling the control switch 62 at the flight station. The conduction of the transistor Q4 also renders an NPN transistor Q3 conductive to clamp the input signal to the operational amplifier A3 to ground potential and thereby driving the transistor Q1 into cutoff and the transistor Q2 into saturation. The conduction of the transistor Q2 is thus latched by the conduction of the transistors Q3 and Q4.

With no overload sensed by either of the two operational amplifier sections, the low signal level signal applied to the trigger circuit 90 results in a low signal level signal being impressed on the base electrode of the transistor Q1 to maintain the transistor Q1 conductive, the transistor Q2 nonconductive and the transistors Q4 and Q5 nonconductive. The conduction of the transistor Q5 and the power switch 30 thus remains under the control of the control switch 62 at the flight station.

The application of a high signal level signal to the trigger circuit 90 as a result of either an overload or short circuit condition results in a high signal on the base electrode of the transistor Q4 turning on of the transistor Q4 and then Q3. The conduction of the transistor Q4 also clamps control line 60 to ground potential to illuminate the CLWL-SW 66, indicating the existence of a fault and the disconnecting of the load 22.

With continued reference to FIG. 1, the circuit 68 provides for the failure of the power switch 30 to turn OFF upon command and the circuit 70 provides for the failure of the power switch 30 to turn ON upon command. Protection for the second condition could be implicit in the control circuitry of the power itself but, in actual practice, this particular failure mode is the lesser problem. The failure of the power switch 30 to turn OFF could be a serious hazard in aircraft control circuitry, since it could result in a runaway surface control or the failure of a transfer pump or primary pump to turn off.

The circuitry 70 provides for the failure of the power switch 30 to turn ON. When the control switch 62 is closed, a potential is applied from the buss 24 to a series RC circuit to tend to charge the capacitor 94. Before the capacitor 94 can charge, however, a positive potential from the collector electrode C of the closed power switch 30 is normally applied via the conductor 96 and a resistor 98 to the base electrode of an NPN transistor Q6 to render it conductive and to shunt the charging current away from the capacitor 94. On the other hand, if the power switch 30 does not turn ON, no potential will be applied to the base electrode of the transistor Q6 and it will remain on open circuit, permitting the capacitor 94 to charge and to apply a high signal level level signal through a blocking diode 100 to the base electrode of the transistor Q4. Conduction of the transistor Q4 clamps the control line 60 to ground potential and latches of the power switch 30 non-conductive as previously described.

The circuitry 68 for treating the failure of the power switch 30 to turn OFF will, when the control switch 62 is closed, apply a high signal level signal from the control line 60 to the base electrode of an NPN transistor Q7. The conduction of the transistor Q7 will shunt current from the power switch 30 via the conductor 96 to a capacitor 102 and discharge the capacitor 102. Thus, the potential on the capacitor cannot build up sufficiently to trigger the SCR 52.

When, however, the control switch 62 is opened, the transistor Q7 is driven into cutoff and, if the power switch 30 fails to turn OFF at this time, the capacitor 102 will be charged from the still energized collector electrode C of the power switch 30 through the conductor 96 sufficiently to trigger SCR 52 through conductor 104. conduction of the SCR 52 will connect the power buss 20 to ground potential through a fuse 106, blowing the fuse and isolating the load 22 from the power buss 20.

While FIG. 1 shows in detail the control and power system for only a single load, in many airplanes the number of loads may be several hundred. A complete system might, therefore, involve a radial or ring buss system serving many power controllers at strategic locations throughout the aircraft. Also, a plurality of control switches located at the flight station will connect each controller at the load stations via miniature gauge wiring. A portion of one such additional circuit is shown at the flight station in FIG. 1.

It will be noted that the basic portion of the solid state power controller as disclosed above in FIG. 1 consists of two separate elements. One element is a logic controller 26 and the other the power switch circuit 30. In the embodiment of FIG. 1, a separate logic circuit is employed for each power switch and the load controlled therethrough. Other embodiments of the present invention avoid duplication of much of the costly logic circuitry.

Figure 2:
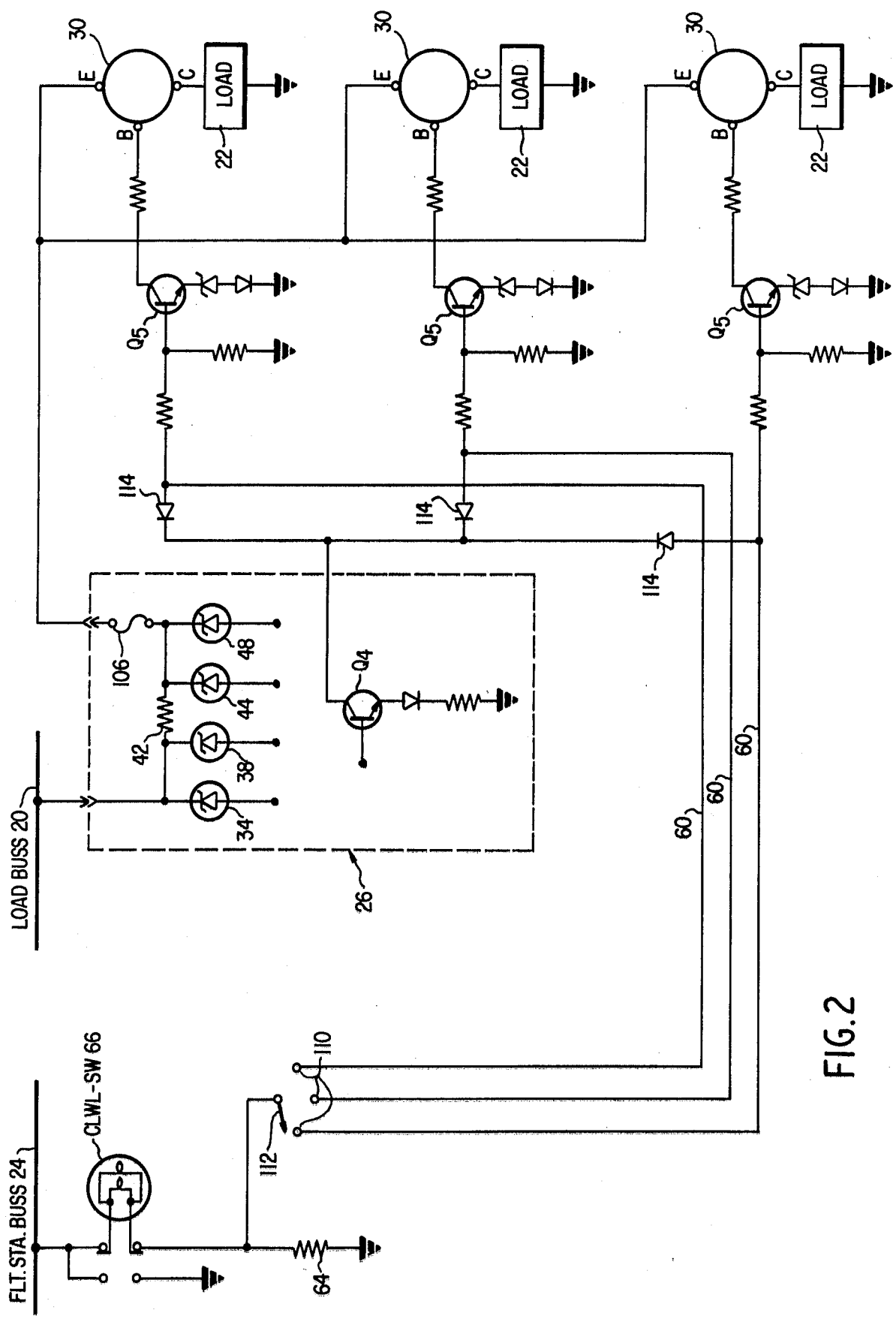
FIG. 2 is a schematic wiring diagram of a second embodiment of the solid state control system of the present invention utilizing one controller for plural loads.

With reference now to FIG. 2 where like elements have been accorded like numerical designations, a single logic controller 26 can be used to control a plurality of power switches 30 and loads 22. In the embodiment illustrated in FIG. 3, the single logic control 26 includes generally the same circuitry as the logic circuitry extending to and including the transistor Q4 of FIG. 1. However, a new printed circuit board (PCB) or the like is provided with a separate transistor Q5 circuit connected to the base electrode of a power switch 30 in the same manner that the transistor Q5 circuit of FIG. 1 is associated with the power switch 30 of that figure. The base electrodes of the transistor Q5 are connected respectively to one of the terminals 110 of a multiple terminal control switch 112 selectively positionable to connect the CLWL-SW 66 to one of the terminals 100. A diode 114 is provided between the base electrodes of each of the transistors Q5 and the collector electrode of the transistor Q4 for isolation purposes i.e. to permit a common clamp for a plurality of power switches.

In operation of the circuit of FIG. 2, the movable arm of the control switch 112 is selectively connected to the contact 110 of a control conductor 60 to effect the conduction of the selected transistor Q5 and thereby close the corresponding power switch 30 to energize the selected load 22. Thereafter, the logic control circuit 26 operates to ultimately trigger the transistor Q4 upon the occurrence of an overload or short circuit as fully described above in connection with FIG. 1. The diodes 114 function, inter alia, to prevent the control signal passing through the control and selector switch 112 from falsely operating any of the unselected ones of the transistors Q5. The modified circuit of FIG. 2 also permits the use of miniature gauge wiring between the flight station and the locations of the load buss and power circuits.

It will be apparent, as disclosed above in connection with the circuit of FIG. 1, that both types of failure mode monitoring may be used in a similar manner in connection with the single logic-plural load arrangement of FIG. 2. It will also be understood that a large plurality of different control switch-selector arrangements as shown in FIG. 2 may be provided to permit control of a number of plural load groups.

Figure 3:
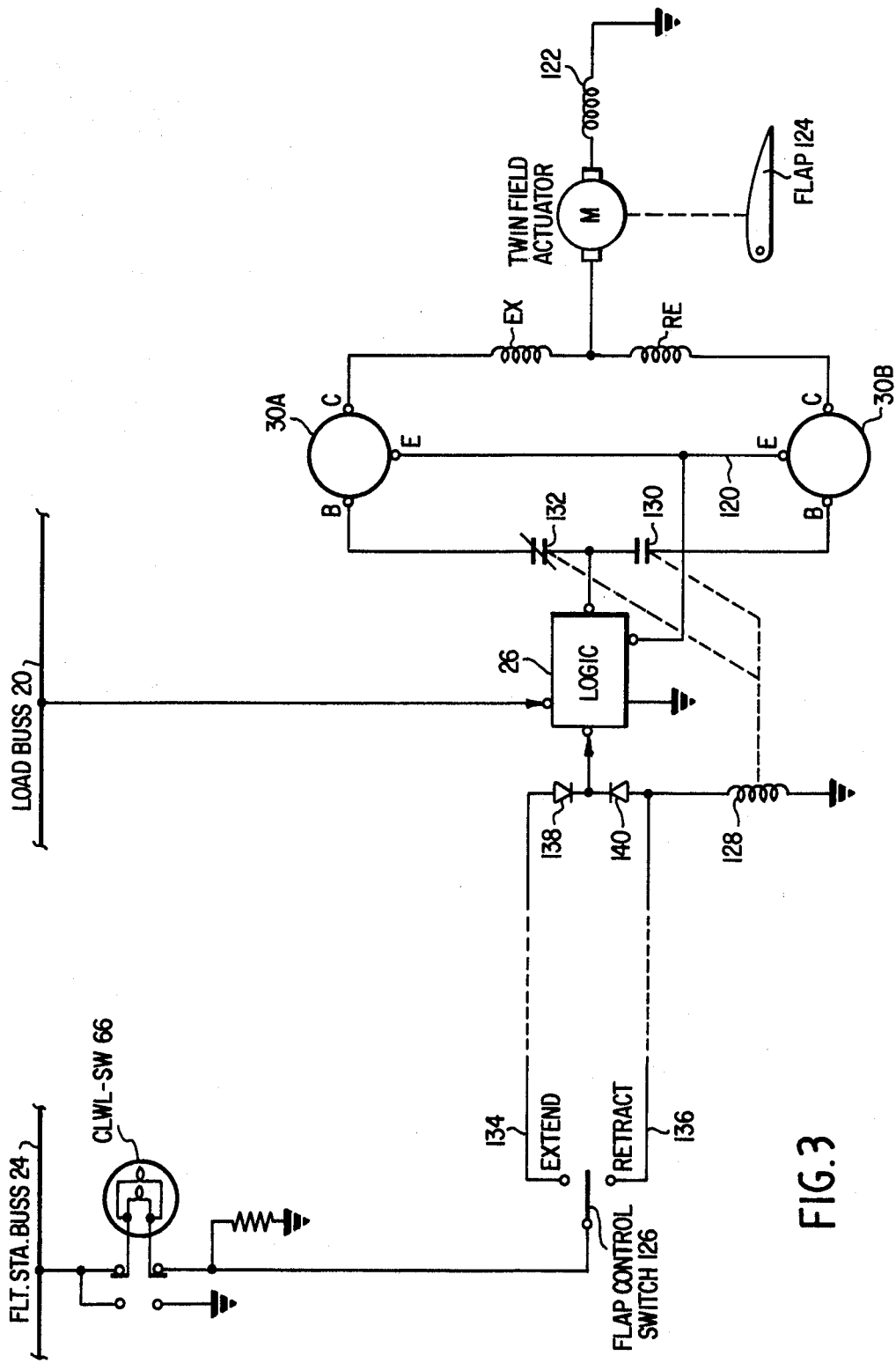
FIG. 3 is a schematic wiring diagram of a third embodiment of the solid state control system of the present invention utilizing two mutually exclusive power switches.

The system of FIG. 3 illustrates an arrangement for controlling switches for two loads, such as the EXTEND and RETRACT field winding of a twin field winding actuator for airplane wing flap control, through use of a single logic system similar to that described in detail in connection with FIG. 1. With reference to FIG. 3, where like elements have been accordaed like numerical designations to those of FIGS. 1 and 2, a loads buss 20 supplies power through controller 26 to a conductor 120 connected to the emitter electrodes E of two power switches 30A to 30B. Power switch 30A when conducting current from its emitter electrode E to its collector electrode C passes the current through the "extend" winding EX, the motor armature M and an electromagnetic brake 122. A flap 124 may be mechanically coupled to the motor or actuator M. The power switch 30B, when conducting current in a similar manner to its collector electrode C, will pass current through the "retract" winding RE and again through the motor armature M and the brake 122. Passage of current through the first circuit moves the flap 124 in the extending direction and passage of current through the second circuit drives the flap 434 in the retracting direction.

In the embodiment shown in FIG. 3, power switches 30A and 30B are selected through the use of a 3-position switch 126 and an electromagnetic device such as a microminiture relay (e.g., a Teledyne 411D9). This device preferably includes a coil 128 adapted to operate normally open contacts 130 and normally closed contacts 132. Operation of the relay 128 may be determined through a flap control switch 126 having a movable arm selectively connected between the CLWL-SW 66 at the flight station and either an EXTEND control line 134 of small gage to the logic circuit 26 or a similar RETRACT control circuit 136. Diodes 138 and 140 in the EXTEND and RETRACT circuits are provided for isoltion purposes i.e. to permit a common control to a plurality of logic controllers.

Connection of the movable arm of switch 126 to the conductor 134 will leave relay coil 128 unenergized and apply and control voltage through the diode 138 to the logic circuit 26. This voltage will operate through the logic circuit 26 as shown in FIG. 1 to apply a conducting bias to the power switch 30A. Current from the power buss 20 will then pass through the power switch 30A to its collector electrode C and from there through the "extend" winding EX and motor armature M to move flap 124 in the extend direction. If the movable arm of the control switch 126 is manually connected to the control conductor 136, control potential will be applied via the diode 140 to energize the relay coil 128 and apply a forward bias signal to the base electrode B of the power switch 30B. The resulting energization of the collector electrode C will energize the motor armature M through the "retract" winding RE to move the flap 434 in retract direction.

When the power switch 30A is energized, the logic circuit will respond to an overload or short circuit in the load circuit through the winding EX in the manner described in connection with the circuit FIG. 1 to open the power switch 30A, latch the logic control 26 and ground the control line 134 to activate the CLWL-SW 66. If the power switch 30B is energized, a corresponding reaction will occur when a like fault occurs in the load circuit through the winding RE.

Both types of failure mode monitoring as described in connection with FIG. 1 may be used for each power switch in the circuit of FIG. 3. Also, it is anticipated that the circuitry of FIG. 3 will be repeated to control a plurality of loads, using only one controller and an equivalent plurality of power switches when only one of the power switches is energized at any one time.

Figure 4:
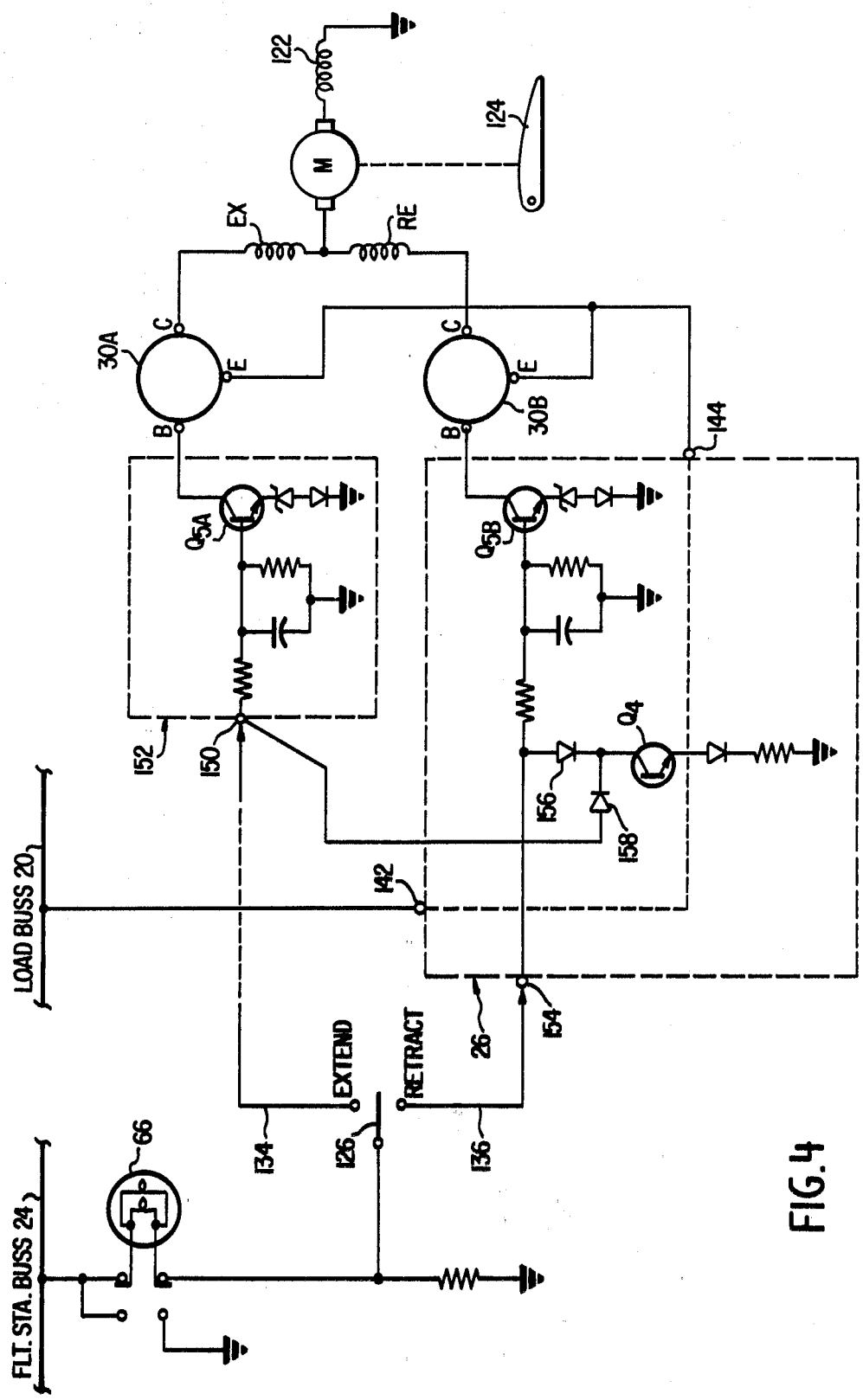
FIG. 4 is a schematic diagram of a fourth embodiment of the solid state control system of the present invention combining elements of the circuits of FIGS. 2 and 3.

FIG. 4 is directed to a system using the principal circuitry of a single logic controller to control a pair of power switches and loads. This system differs from the system of FIG. 3 in that electromechanical switching is eliminated and a small number of parts of the logic control circuit are duplicated. The FIG. 4 system resembles that of FIG. 3, which latter system may be used for two loads as well as three or more loads. It differs slightly from the FIG. 3 arrangement and may in some cases be preferred to it for a particular dual load location type of installation.

In FIG. 4 where like elements have been accorded like numerical designations to those of FIG. 3, power is supplied from the load buss 20 through a logic controller 26 by interconnected terminals 142 and 144 to the emitter electrodes E of two power switches 30A and 30B. The collector electrodes C of the power switches 30A and 30B are connected respectively through field windings EX and RE to an actuator or motor armature winding M and a brake winding 122 as described in connection with FIG. 3. Actuator M is operable to extend or retract the airplane flap 124 according to the energization of the power switches 30A or 30B.

A flap control switch 126 has a movable contact arm connected through a CLWL-SW 66 at the flight station buss 22 as in the circuit of FIG. 3. This movable contact arm is selectively connectable to an EXTEND control line 134 or a RETRACT control line 136. The contact line 134 is connected to a contact 150 of a module 152 and the contact line 136 connected directly to a contact 154 of the logic control device 526.

The module 152 includes the circuitry for an NPN transistor Q5A, the collector electrode of which is connected to the base electrode B of the power switch 30A. Energization of the control conductor 134 through the movable arm of control switch 126 will impose a forward bias on the base electrode of the transistor Q5A turning it on and in turn imposing a forward bias on the base electrode B of the power switch 30A to energize the EX winding so that the flap 124 is moved in the "extend" direction. Disconnection of the movable contact of the switch 126 from the conductor 134 disconnects the circuit 152.

The logic control circuit 26 of FIG. 4 is substantially the same as that illustrated in the circuit of FIG. 1. Only such portions of circuit 26 are shown in FIG. 4 as are necessary to make clear its connections in this modification. Thus, contact 154 from the RETRACT control conductor 136 extends to the circuit for biasing the base of the NPN transistor Q5B corresponding to the transistor Q5 in FIG. 1. Also, diodes 156 and 158 are shown connected from the input terminal lines of the transistors Q5A and Q5B, respectively, to the collector electrode of the NPN transistor Q4. Transistor Q4 thus provides a common clamp for the power switches 30A and 30B.

When the control line 136 is energized through the movable arm of control-selector switch 126, a positive bias is applied to the base of the transistor Q5B to forward bias it and in turn forward bias the power switch 30B into conduction. As a result, the winding RE is energized from the terminal 144 and the flap 124 will be retracted as discussed above.

The modified systems of FIG. 4 provides overload and short circuit protection for the load circuits of whichever of the load circuits of the power switches 30A and 30B may be energized at any particular time. The conduction of the transistor Q4 as a result of such conditions acts to turn off the transistor Q5B and power switch 30B through the diode 156 in the manner described in detail in connection with FIG. 1. A similar response by transistor Q5A and the power switch 30A will result from the conduction of the transistor Q4 as a result of an overload condition.

As with the preceding embodiments, failure mode monitoring as shown and fully described in connection with FIG. 1 can be, and preferably is, used with the modification of FIG. 4. Also, a plurality of different control-selector switch arrangements are preferably employed to permit control of a plurality of plural loads.

The present invention has been described in conjunction with several preferred embodiments. However, various modifications and variations of these described forms of the invention will be evident to persons of ordinary skill in the art. It is intended therefore that the foregoing detailed description of the invention as illustrated in the drawings be considered as exemplary only and that the scope of the invention be interpreted from the following claims when accorded a full range of equivalents.

What is claimed is:

1. A power controller for a load circuit comprising:
    a solid state circuit including an input terminal adapted for connection to a power supply, an output terminal adapted for connection to a load, and a solid state device having a contact terminal; and
    a control device operatively connected to the control terminal of said solid state device for controlling the conductivity thereof comprising:
    a first circuit means for selectively imposing a conductive bias on said solid state device to initially apply power to the load;
    logic circuit means responsive to the passage of current by said solid state device for removing the conductive bias from said solid state device upon the current attaining a value in excess of a first predetermined value for at least a predetermined period of time or in excess of a second predetermined value greater than said first predetermined value for a second predetermined period of time less than said first predetermined period of time, said logic circuit comprising:
        first and second operational amplifiers each energized with a predetermined constant voltage and a second voltage variable in proportion to the current passed by said solid state device;

a trigger circuit for removing the conductive bias from said solid state device;

third and fourth operational amplifiers for successively integrating and inverting the output signal from said first amplifier to apply an activating signal to said trigger circuit in response to the current through said solid state device exceeding said first predetermined value for said first predetermined period of time; and means connecting said second operational amplifier to apply an activating signal to said trigger circuit in response to the current through said solid state device exceeding said second predetermined value for said second predetermined period of time.

2. The power controller of claim 1 further including means responsive to activation of said trigger circuit to remove the conductive bias from said solid state device by grounding the control terminal thereof.

3. A power controller circuit for a load circuit comprising:

a power darlington circuit including an emitter and collector for connection between a power supply and a load, and a base for controlling conductivity between said emitter and collector;

a solid state switching means including first means responsive to impression of an activating positive potential thereon to impress a conducting bias on said darlington base;

a positive supply voltage source displaced from said darlington and said first switching circuit;

a control circuit comprising:
current limiting lamp means connecting to said voltage source;

a control switch having a first terminal connected to said lamp means; and a control conductor connected to a second terminal of said control switch, whereby closure of said control switch will impress an activating positive potential on said solid state means without lighting said lamp means and imposition of ground potential on said control conductor with said control switch closed will cause said lamp to light while limiting current through the control circuit; and a load current responsive device including logic means connected to said first switching circuit to render said solid state means ineffective to impress a conducting bias on said darlington base upon the load current attaining an overload current having at least one preselected overload amplitude for at least one corresponding preselected period of time.

4. A power controller circuit as recited in claim 3 wherein:

said solid state switching means further includes second means responsive to the impression of a fault signal thereon to render said first means ineffective to impress a conducting bias on said darlington base; and said load current responsive device further includes means responsive to an overload current to impress a fault signal on said second means of said solid state switching means to remove the conducting bias from said darlington base and render said darlington circuit non-conductive.

5. A power controller circuit as recited in claim 4 wherein:

said load current responsive device further includes means responsive to a fault signal on said solid state switching means to lock said load current responsive device in a condition to continue impressing a fault signal despite said darlington circuit having been rendered non-conductive.

6. An electric control system for a vehicle including a direct current power supply comprising:

at least two electric load devices;

a solid state power darlington switch circuit for controlling the connection of each said load device for energization from said power supply;

control means selectively operable for controlling the closure of a selected darlington switch circuit;

current sensing means connected in a circuit extending from said power supply to each of said darlington switch circuits and responsive to an overload current from said power supply through a selectively closed darlington switch circuit to automatically open the selectively closed darlington switch circuit;

logic circuitry responsive to overload current in said sensing means, said logic circuitry including one channel operative to provide a unidirectional operative signal upon the current in said sensing means attaining at least a first predetermined overload value for at least a first predetermined period of time or a second predetermined overload value greater than said first predetermined value for a predetermined time; and said unidirectional signal acts on a selectively closed darlington switch circuit to open said darlington switch circuit.

7. The control system as recited in claim 6 wherein two of said load devices are operative upon energization to move a control member of said vehicle in opposing directions.

8. An electrical power system for a vehicle containing a direct power supply grounded at one terminal comprising:

a load device;

a darlington switch with its emitter and collector connected between said power supply and said load device and a base for controlling conductivity therebetween;

a fuse connected between said power supply and said emitter;

a silicon controlled rectifier with its anode connected to said emitter and its cathode to ground, and including a control grid;

solid state means responsive to a positive control potential to render said darlington conductive;

control means including a control switch, displaced from said solid state means, and conductor means for selectively applying a positive potential from said switch to said solid state means to apply a conductive bias to said darlington; and a first mode monitoring circuit comprising:

a capacitor connected between the collector of said darlington and ground;

a transistor having its collector to emitter circuit connected in parallel to said capacitor and its base connected to be biased to non-conductive condition from said conductor of said control means when said control switch is open; and means connecting the ungrounded terminal of said capacitor to the control grid of said silicon controlled rectifier;

whereby failure of said darlington to open upon opening of said control switch will permit said capacitor to charge to a voltage rendering said silicon controlled rectifier conducting to connect said emitter to ground and permit a current to pass through said fuse to blow it.

9. An electrical power system for a vehicle containing a direct current power supply grounded at one terminal comprising:
 a load device;
 a darlington switch with its emitter and collector connected between said power supply and said load device and a base for controlling conductivity therebetween;
 a fuse connected between said power supply and said emitter;
 a silicon controlled rectifier with its anode connected to said emitter and its cathode to ground, and including a control grid;
 a solid state switching circuit comprising:
  first means responsive to impression of an activating positive potential thereon to impress a conducting bias on said darlington base; and
  second means responsive to the impression of a fault signal thereon to render said first means ineffective to impress a conducting bias on said darlington base;
 control means including a control switch, displaced from said solid state circuit, and conductor means for selectively applying a positive potential from said switch to said solid state circuit to impress the conductive bias on said darlington base;
 a load responsive device including means responsive to an overload current to impress a fault signal on said second means of said solid state switching circuit to remove any conducting bias from said darlington base and to lock said load current responsive device in such position; whereby said conductor means of said control means is locked to ground; and
 a first mode monitoring circuit comprising:
  a capacitor connected between the collector of said darlington and ground;
  a transistor having its collector to emitter circuit connected in parallel to said capacitor and its base connected to be biased to non-conductive condition from said conductor of said control means when said control switch is open; and
  means connecting the ungrounded terminal of said capacitor to the control grid of said silicon controlled rectifier;
 whereby failure of said darlington to open upon opening of said control switch will permit said capacitor to charge to a voltage rendering said silicon controlled rectifier conducting to connect said emitter to ground and permit current to pass through said fuse to blow it.

10. An electrical power system as recited in claim 9 wherein is further included means responsive to the absence of a voltage on said emitter of the darlington when said control switch is closed to place a positive potential on said control conductor to impress a signal similar to a fault signal on said second means of said solid state switching circuit to lock said control conductor to ground.

11. An electrical power system as recited in claim 8 wherein is further included means in said solid state means responsive to the absence of a voltage on the emitter of said darlington when said control switch is closed to apply and latch ground potential to said conductor means.

* * * * *